(12) United States Patent
Iida et al.

(10) Patent No.: US 9,007,034 B2
(45) Date of Patent: Apr. 14, 2015

(54) ELECTRIC POWER GENERATION CONTROL SYSTEM FOR VEHICLE

(71) Applicant: Honda Motor Co., Ltd., Minato-ku, Tokyo (JP)

(72) Inventors: Jun Iida, Saitama (JP); Masahiko Asakura, Saitama (JP); Satoru Sunada, Saitama (JP); Hiroshi Endo, Saitama (JP); Kojiro Tsutsumi, Saitama (JP); Ryuko Komatsu, Saitama (JP); Nobumasa Toyoshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 13/722,764

(22) Filed: Dec. 20, 2012

(65) Prior Publication Data

US 2013/0169239 A1    Jul. 4, 2013

(30) Foreign Application Priority Data

Dec. 28, 2011  (JP) ................................. 2011-289063
Oct. 24, 2012  (JP) ................................. 2012-234363

(51) Int. Cl.
*H02J 7/00*       (2006.01)
*H02J 7/14*       (2006.01)
(Continued)

(52) U.S. Cl.
CPC .............. *H02J 7/1492* (2013.01); *H01H 17/00* (2013.01); *H01H 85/46* (2013.01); *H01H 35/00* (2013.01);
(Continued)

(58) Field of Classification Search
CPC ................. H02J 7/00; H02J 7/04; H02J 7/16; H02J 7/1492; H02J 7/0073; H01H 3/00; H01H 7/00; H01H 9/54; H01H 33/59; H01H 17/00; H01H 85/46; H01H 35/00; H01H 83/18; H02H 3/02; H02H 3/42; H02H 5/04; B06L 11/1814; B06L 2240/427; B06L 2240/547; B06L 2240/549; B06L 2260/16; Y02T 10/7005; Y02T 10/642; Y02T 90/14; Y02T 90/127; Y02T 10/92
USPC .......... 320/162, 135, 133, 155, 157; 307/126, 307/130, 140, 141, 153
See application file for complete search history.

(56) References Cited

U.S. PATENT DOCUMENTS 5,671,129 A * 9/1997 Lang ............................... 363/19
5,675,485 A * 10/1997 Seong ............................ 363/97
(Continued)

FOREIGN PATENT DOCUMENTS

EP    2 149 959 A2    2/2010
GB    2 288 928 A    11/1995
(Continued)

OTHER PUBLICATIONS

European Extended Search Report, Application No. 12198887.7-1809 dated Apr. 4, 2013.

*Primary Examiner* — Phallaka Kik
(74) *Attorney, Agent, or Firm* — Mori & Ward, LLP (57) ABSTRACT

An electric power generation control system for a vehicle, which enables generation of electric power by a generator as much as possible while preventing an electrical component from being overheated by power generation by the generator. The electric power generation control system selectively switches a mode of the generator between first and second modes in which an instruction voltage is higher and not higher than an allowable voltage of a wire harness, respectively. A counter value is counted up in the first mode and down in the second mode. When the counter value has reached a higher limit value, the first mode is inhibited and the power generation mode is set to the second mode. This increase the proportion of an execution time period of the first, and accordingly, when a possibility of overheating the wire harness becomes high, the instruction voltage is lowered.

12 Claims, 3 Drawing Sheets

(51) Int. Cl.
| | |
|---|---|
| *H02J 7/16* | (2006.01) |
| *H01H 7/00* | (2006.01) |
| *H01H 9/54* | (2006.01) |
| *H01H 33/59* | (2006.01) |
| *H01H 17/00* | (2006.01) |
| *H01H 85/46* | (2006.01) |
| *H01H 63/00* | (2006.01) |
| *H01H 35/00* | (2006.01) |
| *H01H 83/18* | (2006.01) |
| *H02H 3/02* | (2006.01) |
| *H02H 3/42* | (2006.01) |
| *B60L 11/18* | (2006.01) |
| *H02H 5/04* | (2006.01) |
| *H01H 3/00* | (2006.01) |

(52) U.S. Cl.
CPC ............... *H02H 3/02* (2013.01); *H01H 33/59* (2013.01); *H02H 3/42* (2013.01); *H01H 7/00* (2013.01); *H01H 83/18* (2013.01); *H01H 3/00* (2013.01); *H01H 9/54* (2013.01); *B60L 11/1814* (2013.01); *H02H 5/04* (2013.01); *H02J 7/0073* (2013.01); *H02J 7/1461* (2013.01); *B60L 2240/427* (2013.01); *B60L 2240/547* (2013.01); *B60L 2240/549* (2013.01); *B60L 2260/16* (2013.01); *Y02T 10/7005* (2013.01); *Y02T 10/642* (2013.01); *Y02T 90/14* (2013.01); *Y02T 90/127* (2013.01); *Y02T 10/92* (2013.01)

(56) References Cited

U.S. PATENT DOCUMENTS

| | | | |
|---|---|---|---|
| 6,867,568 | B1 | 3/2005 | Olson et al. |
| 6,944,034 | B1* | 9/2005 | Shteynberg et al. ........ 363/21.13 |
| 8,340,545 | B2* | 12/2012 | Suzuki et al. ................. 399/88 |
| 8,912,778 | B1* | 12/2014 | Bennett et al. ................ 323/283 |
| 2007/0055900 | A1* | 3/2007 | Choi ............................. 713/300 |
| 2010/0033103 | A1* | 2/2010 | Kimura et al. ................ 315/246 |

FOREIGN PATENT DOCUMENTS

| | | |
|---|---|---|
| JP | 02-016344 A | 1/1990 |
| JP | 07-143686 A | 6/1995 |

* cited by examiner

ELECTRIC POWER GENERATION CONTROL SYSTEM FOR VEHICLE

CROSS-REFERENCE TO RELATED APPLICATION

This application is based upon and claims the benefit of priority of the prior Japanese PATENT Application Numbers. 289063/2011, filed Dec. 28, 2011, and 234363/2012, filed Oct. 24, 2012, the disclosure of the prior applications are hereby incorporated in its entirety by reference.

BACKGROUND OF THE INVENTION

1. Field of the Invention

The present invention relates to an electric power generation control system for a vehicle, for controlling electric power generation by a generator using an internal combustion engine as a motive power source.

2. Description of the Related Art

Conventionally, there is known an electric power generation control system for a vehicle, which is disclosed in Japanese Laid-Open Patent Publication (Kokai) No. H2-16344. A generator mounted in the vehicle uses an internal combustion engine as a motive power source to thereby generate voltage and electric power according to supply current supplied to a coil, and the generated electric power is charged in a battery via an electrical component such, as a wire harness. In this electric power generation control system, during other than deceleration of the vehicle, the supply current to the coil is controlled to zero, whereby the generation of electric power by the generator is stopped. On the other hand, when the vehicle is decelerated, the supply current to the coil is set to an initial value to thereby start generation of electric power, and thereafter, the supply current is reduced according to a decrease in the vehicle speed, whereby the generated voltage is gradually reduced from a value corresponding to the initial value of the supply current. This gradually reduces torque for electric power generation to smoothly stop the vehicle.

The conventional electric power generation control system performs electric power generation control only by setting the supply current to the coil to the initial value to start the electric power generation, and reducing the supply current according to the decrease in the vehicle speed. Therefore, in a case where the initial value of the supply current is large and the rate of reduction of the supply current is small, a state in which the supply current to the generator is large and the generated voltage is high sometimes continues for a long time. In such a case, there is a fear that the electrical component for supplying electric power from the generator to the battery generates heat to bring itself to an overheated state in which the temperature thereof is higher than an allowable temperature, causing deterioration of the electrical component and components provided therearound. On the other hand, in order to avoid such a problem, it is envisaged to reduce the generated voltage of the generator as a whole. However, in such a case, although the overheating of the electrical component and the like can be prevented, it is impossible to charge the battery sufficiently.

SUMMARY OF THE INVENTION

It is an object of the present invention to provide an electric power generation control system for a vehicle, which makes it possible to generate electric power by a generator as much as possible while preventing an electrical component from being overheated by electric power generation by the generator.

To attain the above object, the present invention provides an electric power generation control system for a vehicle, which is mounted on a vehicle, for controlling electric power generation by a generator that generates electric power using an internal combustion engine as a motive power source and charges generated electric power in a battery via an electrical component, comprising power generation mode-switching means for selectively switching a power generation mode of the generator between a first power generation mode in which a generated voltage of the generator is not lower than a predetermined voltage and a second power generation mode in which the generated voltage of the generator is lower than the predetermined voltage, first power generation ratio parameter-calculating means for calculating a first power generation ratio parameter which represents a ratio of an execution time period of the first power generation mode to an execution time period of the second power generation mode, as occasion arises, and power generation mode-determining means for inhibiting the first power generation mode when the calculated first power generation ratio parameter has reached a predetermined higher limit value and determining that the power generation mode is to be set to the second power generation mode.

According to this electric power generation control system, the power generation mode of the generator is selectively switched between the first power generation mode in which the generated voltage is not lower than the predetermined voltage and the second power generation mode in which the generated voltage is lower than the predetermined voltage. Further, the first power generation ratio parameter which represents a ratio of an execution time period of the first power generation mode to an execution time period of the second power generation mode is calculated as occasion occurs. Then, the first power generation mode is inhibited when the calculated first power generation ratio parameter has reached the predetermined higher limit value, and the power generation mode is determined to be set to the second power generation mode. This makes it possible, when the ratio of the execution time period of the first power generation mode to the execution time period of the second power generation mode becomes high, to make the generated voltage lower than the predetermined voltage, to thereby suppress heat generation of the electrical component for charging the generated electric power in the battery and hence prevent the electrical component from being overheated. Further, the first power generation mode is permitted until the first power generation ratio parameter reaches the predetermined higher limit value as a general rule, whereby it is possible to generate electric power at a higher generated voltage as much as possible.

Preferably, the power generation mode-determining means maintains the inhibition of the first power generation mode during an inhibition time period which is a time period from a time when the first power generation ratio parameter has reached the predetermined higher limit value to a time when the first power generation ratio parameter lowers to a predetermined lower limit value.

With the configuration of thus preferred embodiment, a time period from a time when the first power generation ratio parameter has reached the predetermined higher limit value to a time when the same lowers to the predetermined lower limit value is defined as an inhibition time period, and during this inhibition time period, the first power generation mode is inhibited. Thus, once the first power generation mode is inhibited when the first power generation ratio parameter has reached the higher limit value, thereafter, the state inhibiting the first power generation mode is maintained until the first power generation ratio parameter lowers to the predetermined lower limit value. This makes it possible to sufficiently suppress the heat generation of the electrical component and thereby positively prevent the electrical component from being overheated. Further, it is also possible to avoid frequent switching between the permitted state of the first power generation mode and the inhibited state of the same.

More preferably, the power generation mode-determining means inhibits the first power generation mode, in a case where after the first power generation ratio parameter has lowered to the predetermined lower limit value, a predetermined condition is satisfied which is at least one of a condition in which the vehicle is decelerating and a condition in which an amount of fuel supply to the engine is not more than a predetermined value.

For example, in a case where the vehicle has been traveling downhill for a long time, the first power generation ratio parameter sometimes lowers from the predetermined higher limit value to the predetermined lower limit value, in a state in which a predetermined condition (a condition in which the vehicle is decelerating and/or a condition in which the amount of fuel supply to the engine is not more than a predetermined value) continues to be satisfied, and during this time, electric power generation in the second power generation mode is continuously performed. Accordingly, in such a state, if the first power generation mode is permitted when the first power generation ratio parameter has lowered to the lower limit value, this increases the amount of electric power generation and there is a fear that the battery is overcharged. With the configuration of this preferred embodiment, after the first power generation ratio parameter has lowered to the lower limit value, when the above predetermined condition is satisfied, the first power generation mode is inhibited, and hence in the above-mentioned state, charging of the battery is restricted so that overcharging of the battery can be prevented.

More preferably, the power generation mode-determining means permits the first power generation mode during a non-inhibition time period which is a time period from a time when the first power generation ratio parameter has lowered to the lower limit value to a time when the first power generation ratio parameter reaches the higher limit value, when the predetermined condition is satisfied.

With the configuration of this preferred embodiment, a time period from a time when the first power generation ratio parameter has lowered to the predetermined lower limit value to a time when the same reaches the predetermined higher limit value is defined as a non-inhibition time period, and during the non-inhibition time period, the first power generation mode is permitted when the above-mentioned predetermined condition is satisfied. When the predetermined condition is satisfied, output demanded of the engine is small. Therefore, by permitting the first power generation mode in such a state, it is possible to make effective use of surplus kinetic energy of the engine, and thereby cause the generator to sufficiently generate electric power. Further, the above-defined non-inhibition time period is a time period which follows the inhibition time period, and during the inhibition time period, the heat generation of the electrical component is sufficiently suppressed. Therefore, even if electric power generation is performed in the first power generation mode, the overheating of the electrical component is not caused.

Further preferably, the power generation mode-determining means determines that the power generation mode is to be set to the second power generation mode, during the non-inhibition time period, when the predetermined condition is not satisfied, and the electric power generation control system further comprises generated voltage-setting means for setting the generated voltage of the generator in the second power generation mode during the inhibition time period to be lower than the generated voltage of the generator in the second power generation mode during the non-inhibition time period.

With the configuration of this preferred embodiment, the power generation mode-determining means inhibits the first power generation mode when the predetermined condition is not satisfied even during the non-inhibition time period, and determines that the power generation mode is to be set to the second power generation mode. Further, the generated voltage of the generator in the second power generation mode during the inhibition time period is set to be lower than the generated voltage of the generator in the second power generation mode during the non-inhibition time period. As mentioned hereinabove, the inhibition time period starts immediately after the first power generation ratio parameter has reached the predetermined higher limit value, and hence, especially immediately after the start, a margin to the overheating of the electrical component is small. Therefore, by setting the generated voltage in the second power generation mode during the inhibition time period to be lower, the heat generation of the electrical component is more suppressed, and it is possible to positively prevent the electrical component from being overheated.

Preferably, the first power generation ratio parameter-calculating means is a counter, and the first power generation ratio parameter is a counter value which is counted up in the first power generation mode and is counted down in the second power generation mode, by the counter.

With the configuration of this preferred embodiment, the first power generation ratio parameter-calculating means is a counter, and its counter value is counted up in the first power generation mode and down in the second power generation mode, and is used as the first power generation ratio parameter. As the counter value which is counted in such a manner is larger, it indicates a larger ratio of an execution time period of the first power generation mode to an execution time period of the second power generation mode, and hence a higher degree of heat generation of the electrical component and a smaller margin to the overheating. As described above, the counter value of the counter represents the degree of the heat generation of the electrical component, and hence it is possible to dispense with a sensor for directly detecting the heat generation, and reduce costs.

More preferably, a count up rate of the counter in the first power generation mode is larger than a countdown rate of the counter in the second power generation mode.

With the configuration of this preferred embodiment, the count up rate of the counter in the first power generation mode is larger than the countdown rate of the counter in the second power generation mode, and hence in the first power generation mode, the counter value is counted more largely, that is, the degree of the heat generation of the electrical component is estimated on the safe side. Therefore, in a state in which the margin to the overheating of the electrical component is secured, when the counter value reaches the predetermined higher limit value, the first power generation mode can be inhibited and the overheating of the electrical component can be more positively prevented.

More preferably, the countdown rate of the counter in the second power generation mode is set according to the generated voltage of the generator.

The amount of heat generation of the electrical component becomes smaller as the generated voltage of the generator is lower. With the configuration of this preferred embodiment, the countdown rate of the counter in the second power generation mode is set according to the generated voltage of the generator, the countdown during this time is performed appropriately while excellently reflecting thereon a lowering degree of heat generation of the electrical component according to the generated voltage.

Preferably, the electric power generation control system further comprises operation voltage-instructing means for instructing an operating voltage of a fan of an air conditioner using the battery as an electric power source, and the power generation mode-determining means inhibits the first power generation mode when the instructed operating voltage is not lower than a predetermined value.

In a case where an instructed operating voltage of the fan of the air conditioner that uses the battery as the electric power source is high, that is, when the fan is to be rotated at a high speed, if the generated voltage of the generator is set to be high, an actual operating voltage of the fan fluctuate by fluctuation in the generated voltage, which tends to cause large fluctuation of the rotational speed of the fan, and hence there is a fear that noise increases. With the above configuration, the first power generation mode is inhibited when the instructed operating voltage of the fan is not lower than a predetermined value, and hence the fluctuation of the actual operating voltage of the fan caused by the fluctuation of the generated voltage of the generator can be suppressed, and accordingly, it is possible to effectively suppress the fluctuation of the rotational speed of the fan and noise caused thereby.

The above and other objects, features, and advantages of the present invention will become more apparent from the following detailed description taken in conjunction with the accompanying drawings.

DETAILED DESCRIPTION OF PREFERRED EMBODIMENTS

Figure 1:
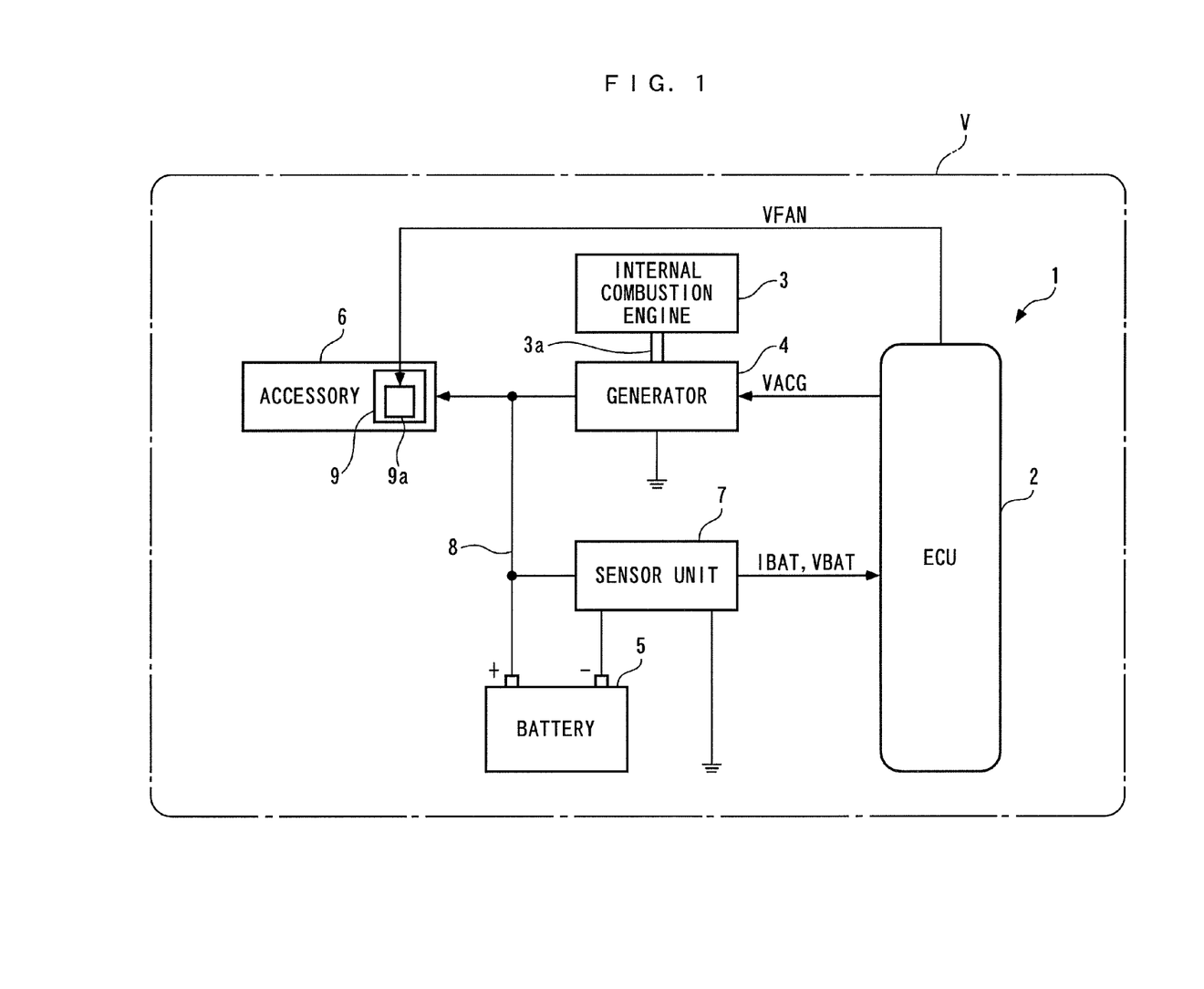
FIG. 1 is a schematic view of an electric power generation control system according to embodiments together with a vehicle to which the electric power generation control system is applied.

The invention will now be described in detail with reference to drawings showing preferred embodiments thereof. As shown in FIG. 1, a vehicle V to which is applied an electric power generation control system 1 according to the embodiments has an internal combustion engine (hereinafter referred to as the "engine") 3, a generator 4, a battery 5, an accessory 6 and so on mounted thereon. This battery 5 is connected to the generator 4 and the accessory 6 via a wire harness 8, and the charging capacity of the battery 5 is controlled by changing an instruction voltage VACG to the generator 4 by an ECU 2. The charging capacity corresponds to the quantity of electric power which can be taken out from the battery 5 before the voltage of the battery 5 reaches the discharge termination voltage, when the battery 5 is held in a discharge state.

The generator 4 is a combination of an AC generator (not shown) and a control circuit (not shown) for controlling the AC generator. The generator 4 is linked to the engine 3 mounted on the vehicle V via a crankshaft 3a, and is configured to generate electric power using the engine 3 as a motive power source.

The control circuit controls the AC generator such that according to a drive signal indicative of an instruction voltage VACG, which is output from the ECU 2, the AC generator generates electric power at the instruction voltage VACG. The electric power generated by the generator 4 is charged in the battery 5 via the wire harness 8.

The wire harness 8 is configured to have an allowable voltage VMAX (e.g. 14.5V) applicable thereto, and has characteristics that the amount of heat generated thereby increases when a higher voltage than the allowable voltage VMAX is applied. Further, the accessory 6 includes an air conditioner 9, audio equipment (not shown), etc., and is operated by electric power supplied from the battery 5.

The air conditioner 9 includes air conditioning equipment, such as an evaporator and a heater (neither of which is shown), a blower fan 9a for blowing air, a control circuit (not shown) for controlling the blower fan 9a, and so forth. The operating voltage of the blower fan 9a is controlled according to a drive signal based on an instruction voltage VFAN, which is output from the ECU 2 to the control circuit.

A sensor unit 7 is a combination of a sensor element and an electric circuit (neither of which is shown), and detects a battery current IBAT and a battery terminal voltage VBAT to output respective detection signals indicative of the detected battery current IBAT and battery terminal voltage VBAT to the ECU 2. The ECU 2 calculates electric power consumption ELCON of the accessory 6 according to the detection signals.

The ECU 2 is implemented by a microcomputer comprising a CPU, a RAM, a ROM, and an I/O interface (none of which are shown). The ECU 2 performs various computing operations according to control programs and the like stored in the ROM. In the embodiment, the ECU 2 corresponds to power generation mode-switching means, first power generation ratio parameter-calculating means, power generation mode-determining means, generated voltage-setting means, and operation voltage-instructing means.

Figure 2:
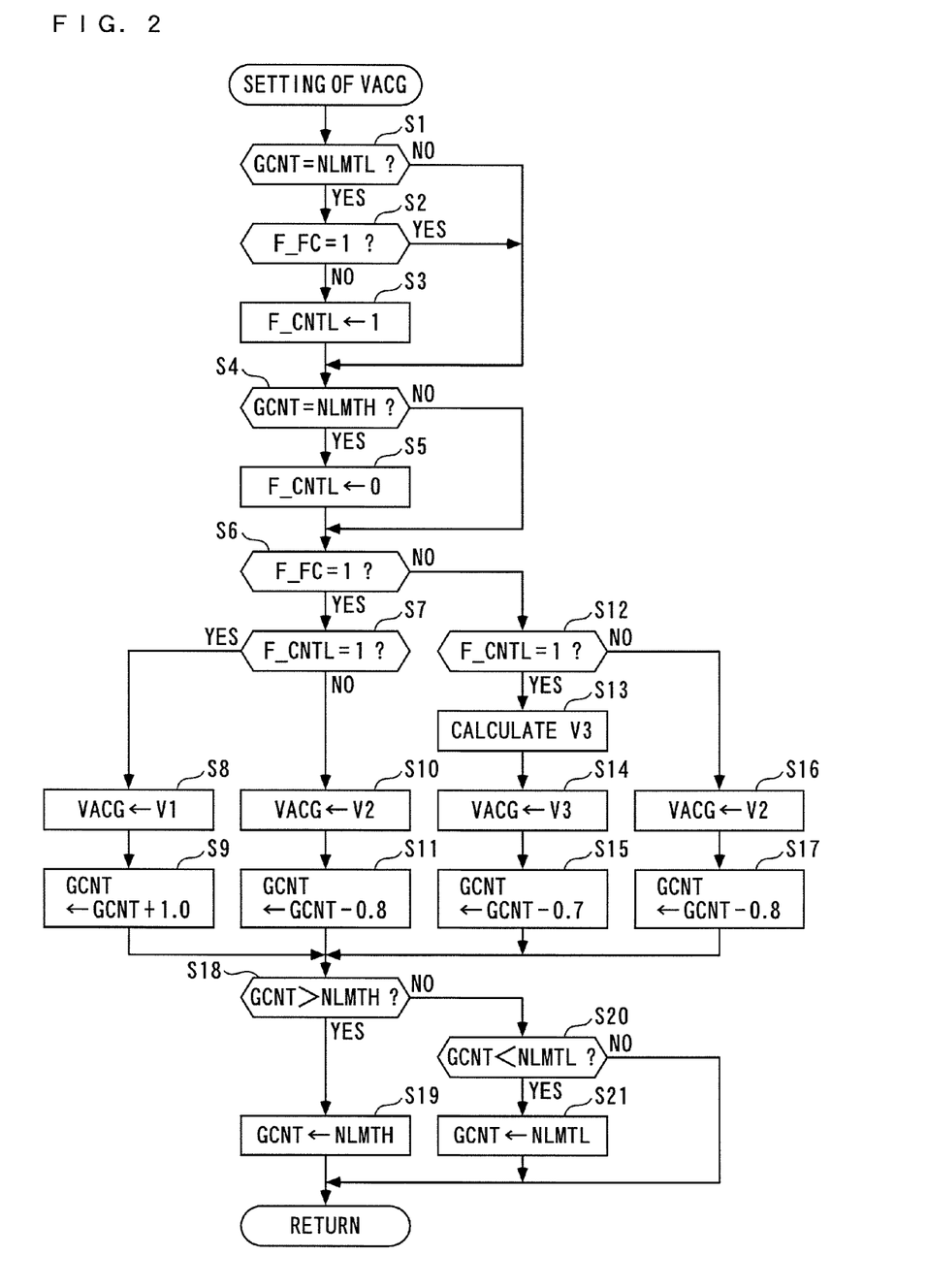
FIG. 2 is a flowchart showing a process for setting an instruction voltage to a generator, according to a first embodiment.

Next, a process for setting the instruction voltage VACG for the generator 4 executed by the ECU 2 according to the first embodiment will be described with reference to FIG. 2. This process selectively determines the power generation mode of the generator 4 in a manner switching between a first power generation mode in which the instruction voltage VACG is higher than the allowable voltage VMAX of the wire harness 8 and a second power generation mode in which the instruction voltage VACG is lower than the allowable voltage VMAX, and sets the instruction voltage VACG according to the determined generation mode. This process is executed whenever a predetermined time period (e.g. 0.1 sec.) elapses.

In the present process, first, in a step 1 (shown as S1 in abbreviated form; the following steps are also shown in abbreviated form), it is determined whether or not a counter value GCNT is equal to a predetermined lower limit value NLMTL (e.g. 0). As described hereinafter, this counter value GCNT is counted up in the first power generation mode and down in the second power generation mode, and represents a ratio of an execution time period of the first power generation mode to an execution time period of the second power generation mode (hereinafter referred to as the "first power generation mode ratio").

If the answer to the question in the step 1 is affirmative (YES), it is determined in a step 2 whether or not a fuel cut flag F_FC is equal to 1. This fuel cut flag F_FC is set to 1 when deceleration fuel cut is being performed for inhibiting fuel supply to the engine 3 during deceleration of the vehicle V. If the answer to the question of the step 2 is negative (NO), i.e. if the counter value GCNT has reached the lower limit value NLMTL, which means that the first power generation mode ratio is very low, and at the same time deceleration fuel cut is not being performed, a lower limit value reached flag F_CNTL is set to 1 in a step 3, and the process proceeds to a step 4.

On the other hand, if the answer to the question of the step 1 is negative (NO), i.e. if the counter value GCNT has not reached the lower limit value NLMTL, or if the answer to the question of the step 2 is affirmative (YES), i.e. if deceleration fuel cut is being performed, the process skips the step 3 and proceeds to the step 4.

In this step 4, it is determined whether or not the counter value GCNT is equal to a predetermined higher limit value NLMTH (e.g. 300). If the answer to the question is affirmative (YES), i.e. if the counter value GCNT has reached the higher limit value NLMTH, which means that the first power generation mode ratio is very high, the lower limit value reached flag F_CNTL is set to 0 in a step 5, and the process proceeds to a step 6. On the other hand, if the answer to the question of the step 4 is negative (NO), the process skips the step 5 and proceeds to the step 6.

Hereafter, a time period from a time when the counter value GCNT reaches the higher limit value NLMTH to a time when the same lowers to the lower limit value NLMTL (time period during which F_CNTL=0) is referred to as an inhibition time period, and a time period from a time when the counter value GCNT lowers to the lower limit value NLMTL to a time when the same reaches the higher limit value NLMTH (time period in which F_CNTL=1) is referred to as a non-inhibition time period.

In the step 6, it is determined whether or not the fuel cut flag F_FC is equal to 1. If the answer to the question is affirmative (YES), it is determined in a step 7 whether or not the lower limit value reached flag F_CNTL is equal to 1. If the answer to the question is affirmative (YES), i.e. if deceleration fuel cut is being performed during the non-inhibition time period, that the power generation mode is determined to be set to the first power generation mode, and the instruction voltage VACG is set to a first predetermined voltage V1 (e.g. 16V) for the first power generation mode, which is higher than the allowable voltage VMAX of the wire harness 8 (step 8). Further, the counter value GCNT is counted up by adding 1.0 to the immediately preceding value thereof (step 9), and the process proceeds to a step 18, referred to hereinafter.

On the other hand, if the answer to the question of the step 7 is negative (NO), i.e. if, deceleration fuel cut is being performed during the inhibition time period, the power generation mode is determined to be set to the second power generation mode, and the instruction voltage VACG is set to a second predetermined voltage V2 (e.g. 12.5V) for the inhibition time period, which is lower than the allowable voltage VMAX of the wire harness 8 (step 10). Further, the counter value GCNT is counted down by subtracting 0.8 from the immediately preceding value thereof (step 11), and the process proceeds to the step 18, referred to hereinafter.

On the other hand, if the answer to the question of the step 6 is negative (NO), i.e. if the fuel cut flag F_FC is 0, it is determined in a step 12 whether or not the lower limit value reached flag F_CNTL is equal to 1. If the answer to the question is affirmative (YES), i.e. if deceleration fuel cut is not being performed during the non-inhibition time period, the power generation mode is determined to be set to the second power generation mode, and a third predetermined voltage V3 for the non-inhibition time period is calculated (step 13), and then the calculated third predetermined voltage V3 is set as the instruction voltage VACG (step 14).

The calculation of the third predetermined voltage V3 is performed by searching a predetermined map (not shown) according to the electric power consumption ELCON of the accessory 6. In this map, the third predetermined voltage V3 is set to a larger value as the electric power consumption ELCON is larger, and is within a predetermined range (e.g. 12.5-14.5V) which is lower than the allowable voltage VMAX of the wire harness 8. In a step 15 following the step 14, the generation counter value GCNT is counted down by subtracting 0.7, which is smaller than the subtraction value (=0.8) in the above-mentioned inhibition time period, from the immediately preceding value thereof, and the process proceeds to the step 18.

On the other hand, if the answer to the question of the step 12 is negative (NO), i.e. if deceleration fuel cut is not being performed in the inhibition time period, the power generation mode is determined to be set to the second power generation mode, and the instruction voltage VACG is set to the second predetermined voltage V2 (step 16), similarly to the step 10. Further, similarly to the step 11, the generation counter value GCNT is counted down (step 17) by subtracting 0.8 from the immediately preceding value thereof, and the process proceeds to the step 18.

In the steps 18 et seq. following the step 9, 11, 15, or 17, a process for limiting the counter value GCNT is performed. First, in the step 18, it is determined whether or not the counter value GCNT is larger than the higher limit value NLMTH. If the answer to the question is affirmative (YES), the counter value GCNT is set to the higher limit value NLMTH in a step 19, followed by terminating the present process.

On the other hand, if the answer to the question of the step 18 is negative (NO), it is determined in a step 20 whether or not the counter value GCNT is smaller the lower limit value NLMTL. If the answer to the question is affirmative (YES), the counter value GCNT is set to the lower limit value NLMTL in a step 21, followed by terminating the present process. On the other hand, if the answer to the question of the step 20 is negative (NO), i.e. if NLMTL<GCNT<NLMTH holds, the present process is immediately terminated.

As described above, according to the present embodiment, the power generation mode of the generator 4 is selectively determined in a manner switching between the first power generation mode in which the instruction voltage VACG is higher than the allowable voltage VMAX of the wire harness 8 and the second power generation mode in which the instruction voltage VACG is lower than the allowable voltage VMAX. Further, the counter value GCNT is counted up in the first power generation mode (step 9) and down in the second power generation mode (steps 11, 15, 17).

Then, when the counter value GCNT has reached the higher limit value NLMTH, the first power generation mode is inhibited and the power generation mode is set to the second power generation mode (step 7: NO). This causes the ratio of an execution time period of the first power generation mode to the second power generation mode to be increased, and in accordance with this, when a possibility of overheating the wire harness 8 becomes high, the instruction voltage VACG is lowered from the first predetermined voltage V1 to the second predetermined voltage V2, whereby the heat generation of the wire harness 8 can be suppressed, and hence the overheating thereof can be prevented. Further, the counter value GCNT represents a margin to the overheating of the wire harness 8, and hence a sensor for directly detecting the same can be dispensed with, which makes it possible to reduce costs.

Further, as described above, once the first power generation mode is inhibited, during the inhibition time period thereafter until the counter value GCNT lowers to the lower limit value NLMTL, the inhibition state of the first power generation mode is maintained (step 7). This sufficiently suppresses the heat generation of the wire harness 8, whereby it is possible to positively prevent the wire harness 8 from being overheated, and avoid frequent switching between the first power generation mode and the second power generation mode.

Further, during the non-inhibition time period after the counter value GCNT has lowered to the lower limit value NLMTL, the first power generation mode is permitted (step 6: YES) when deceleration fuel cut is being performed. Therefore, the generator 4 can sufficiently generate electric power by making effective use of surplus kinetic energy of the engine 3.

Further, during the inhibition time period, in a case where the counter value GCNT has lowered to the lower limit value NLMTL, if deceleration fuel cut is being performed, the first power generation mode is inhibited (step 2: YES). This makes it possible, for example, in a case where the vehicle V has traveled downhill for a long time and the generation of electric power has been performed in the second power generation mode for the whole inhibition time period, to restrict charging of the battery 5 to thereby prevent the battery 5 from being overcharged.

Further, the instruction voltage VACG in the second power generation mode during the inhibition time period is set to be lower than the instruction voltage VACG in the second power generation mode during the non-inhibition time period (steps 10, 16). This makes it possible to further suppress the heat generation of the wire harness 8 and more positively prevent the wire harness 8 from being overheated. Further, depending on the different values of the instruction voltage VACG, the subtraction value (=0.8) of the counter value GCNT during the inhibition time period is set to a larger value than the subtraction value (=0.7) of the counter value GCNT during the non-inhibition time period, which makes it possible to appropriately perform the countdown of the counter value during the second power generation mode, while reflecting thereon a lowering degree of the temperature of the wire harness 8 dependent on the instruction voltage VACG.

Further, the addition value (=1.0) for counting up the counter value GCNT in the first power generation mode is set to a larger value than the subtraction value (=0.8, or 0.7) for counting down the same in the second power generation mode. Therefore, the temperature of the wire harness 8 is estimated on the safe side, and it is possible to more positively prevent the wire harness 8 from being overheated.

Furthermore, the third predetermined voltage V3 set as the instruction voltage VACG in the second power generation mode during the non-inhibition time period is set according to the electric power consumption ELCON of the accessory 6 (step 13). Therefore, even if the electric power consumption ELCON is large, the charging state of the battery 5 can be secured.

Figure 3:
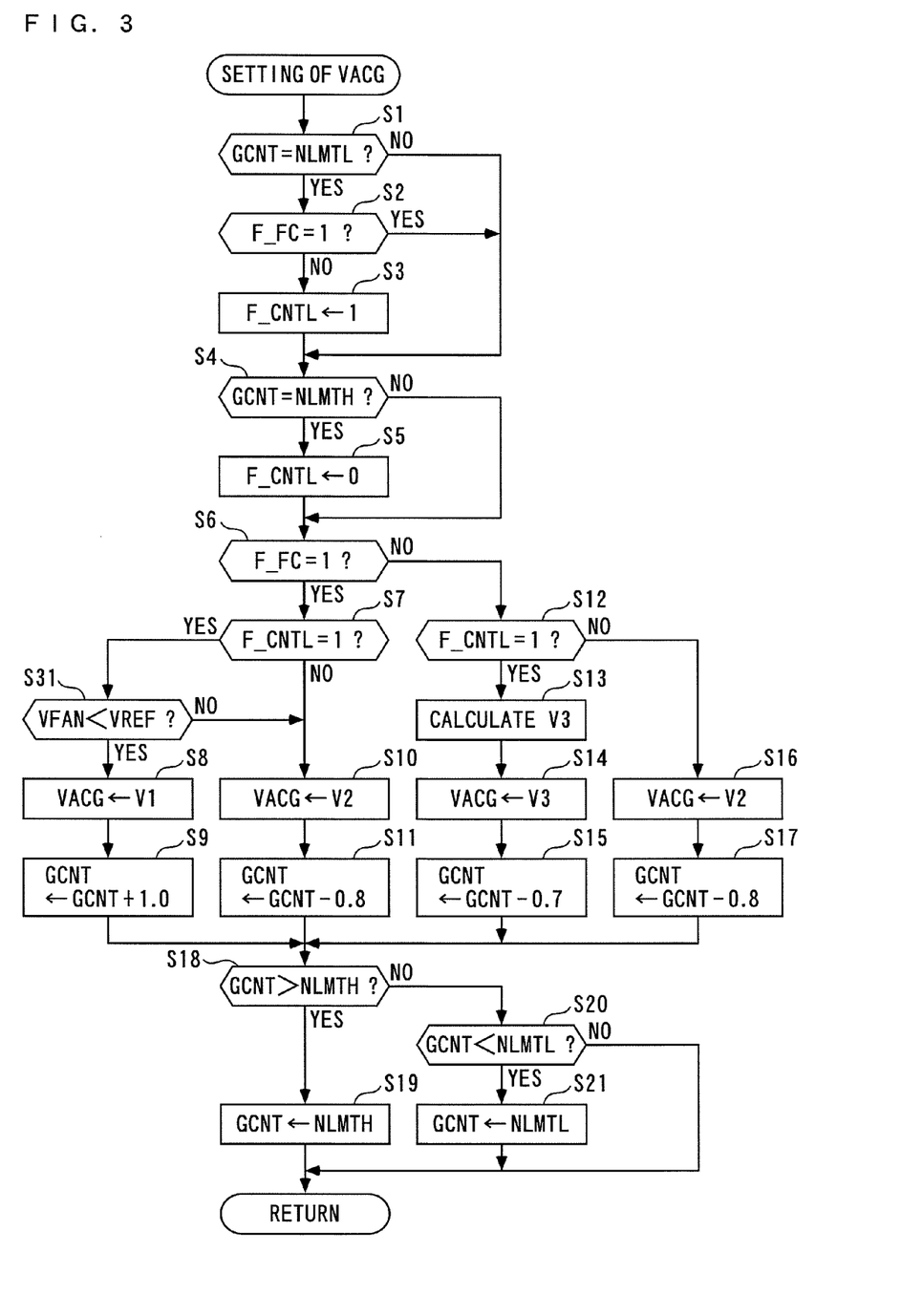
FIG. 3 is a flowchart showing a process for setting an instruction voltage to a generator, according to a second embodiment.

Next, a process for setting the instruction voltage VACG to the generator 4 according to a second embodiment will be described with reference to FIG. 3. As is clear from a comparison with FIG. 2, this process adds setting dependent on an instruction voltage VFAN to the blower fan 9*a* of the air conditioner 9, to the above-described process according to the first embodiment. The same steps as those in FIG. 2 are denoted by the same step numbers, and description is given mainly of added steps.

In the present process, if the answer to the question of the step 7 is affirmative (YES), i.e. if deceleration fuel cut is being performed during the non-inhibition time period, it is determined whether or not the instruction voltage VFAN to the blower fan 9*a* is lower than a predetermined value VREF (step 31).

If the answer to the question of the step 31 is affirmative (YES), i.e. the instruction voltage VFAN< the predetermined value VREF holds, the power generation mode is determined to be set to the first power generation mode, similarly to the first embodiment, so that the process proceeds to the steps 8 and 9, wherein the instruction voltage VACG to the generator 4 is set to the above-mentioned first predetermined voltage V1 (e.g. 16V) for the first power generation mode, and the counter value GCNT is counted up by adding 1.0 to the immediately preceding value thereof, whereafter the process proceeds to the step 18.

On the other hand, if the answer to the question of the step 31 is negative (NO), i.e. the instruction voltage VFAN is not lower than the predetermined value VREF, the power generation mode is determined to be set to the second power generation mode, so that the process proceeds to the steps 10 and 11, wherein the instruction voltage VACG is set to the second predetermined voltage V2 (e.g. 12.5V) which is lower than the first predetermined voltage V1, and the generation counter value GCNT is counted down by subtracting 0.8 from the immediately preceding value thereof, whereafter the process proceeds to the step 18. The other steps in the present process are the same as those in the first embodiment.

As described above, according to the present embodiment, in the case where deceleration fuel cut is being performed during the non-inhibition time period, when the instruction voltage VFAN to the blower fan 9*a* is not lower than the predetermined value VREF, the first power generation mode is inhibited, and the instruction voltage VACG to the generator 4 is set to the second predetermined voltage V2 which is lower than the first predetermined voltage V1. This can suppress a fluctuation of an actual operating voltage of the blower fan 9*a* caused by a fluctuation of a generated voltage of the generator 4. Accordingly, it is possible to effectively suppress fluctuation of a rotational speed of the blower fan 9*a* and noise caused thereby.

It should be noted that the present invention is by no means limited to the embodiment described above, but it can be practiced in various forms. For example, although in the above-described embodiment, permission of the first power generation mode is determined according to whether or not deceleration fuel cut is being performed, the permission may be determined according to whether or not the amount of fuel supply to the engine 3 is not larger than a predetermined value or may be determined according to whether or not the vehicle V is decelerating.

Further, although in the above-described embodiments, the subtraction value (=0.7) of the counter value GCNT in the second power generation mode during the non-inhibition time period is a fixed value, it may be set according to the third predetermined voltage V3. Further, although the first predetermined voltage V1 and the second predetermined voltage V2 which are set as the instruction voltage VACG are also fixed values, similarly to the third predetermined voltage V3, they may be set according to the electric power consumption ELCON of the accessory 6.

Further, although the embodiments are examples of application of the present invention to a vehicle that uses the engine alone as the motive power source, it is needless to say that the present invention may be applied to a hybrid vehicle.

It is further understood by those skilled in the art that the foregoing are preferred embodiments of the invention, and that various changes and modifications may be made without departing from the spirit and scope thereof.

What is claimed is:

1. An electric power generation control system for a vehicle, which is mounted on a vehicle, for controlling electric power generation by a generator that generates electric power using an internal combustion engine as a motive power source and charges generated electric power in a battery via an electrical component, comprising:

power generation mode-switching means for selectively switching a power generation mode of the generator between a first power generation mode in which a generated voltage of the generator is not lower than a predetermined voltage and a second power generation mode in which the generated voltage of the generator is lower than the predetermined voltage;

first power generation ratio parameter-calculating means for calculating a first power generation ratio parameter which represents a ratio of an execution time period of the first power generation mode to an execution time period of the second power generation mode, as occasion arises; and power generation mode-determining means for inhibiting the first power generation mode when the calculated first power generation ratio parameter has reached a predetermined higher limit value and determining that the power generation mode is to be set to the second power generation mode.

2. The electric power generation control system as claimed in claim 1, wherein said power generation mode-determining means maintains the inhibition of the first power generation mode during an inhibition time period which is a time period from a time when the first power generation ratio parameter has reached the predetermined higher limit value to a time when the first power generation ratio parameter lowers to a predetermined lower limit value.

3. The electric power generation control system as claimed in claim 2, wherein said power generation mode-determining means inhibits the first power generation mode, in a case where after the first power generation ratio parameter has lowered to the predetermined lower limit value, a predetermined condition is satisfied which is at least one of a condition in which the vehicle is decelerating and a condition in which an amount of fuel supply to the engine is not more than a predetermined value.

4. The electric power generation control system as claimed in claim 3, wherein said power generation mode-determining means permits the first power generation mode during a non-inhibition time period which is a time period from a time when the first power generation ratio parameter has lowered to the lower limit value to a time when the first power generation ratio parameter reaches the higher limit value, when the predetermined condition is satisfied.

5. The electric power generation control system as claimed in claim 4, wherein said power generation mode-determining means determines that the power generation mode is to be set to the second power generation mode, during the non-inhibition time period, when the predetermined condition is not satisfied, the electric power generation control system further comprising generated voltage-setting means for setting the generated voltage of the generator in the second power generation mode during the inhibition time period to be lower than the generated voltage of the generator in the second power generation mode during the non-inhibition time period.

6. The electric power generation control system as claimed in claim 2, wherein said power generation mode-determining means permits the first power generation mode during a non-inhibition time period which is a time period from a time when the first power generation ratio parameter has lowered to the lower limit value to a time when the first power generation ratio parameter reaches the higher limit value, when the predetermined condition is satisfied.

7. The electric power generation control system as claimed in claim 6, wherein said power generation mode-determining means determines that the power generation mode is to be set to the second power generation mode, during the non-inhibition time period, when the predetermined condition is not satisfied, the electric power generation control system further comprising generated voltage-setting means for setting the generated voltage of the generator in the second power generation mode during the inhibition time period to be lower than the generated voltage of the generator in the second power generation mode during the non-inhibition time period.

8. The electric power generation control system as claimed in claim 1, wherein said first power generation ratio parameter-calculating means is a counter, and the first power generation ratio parameter is a counter value which is counted up in the first power generation mode and is counted down in the second power generation mode, by the counter.

9. The electric power generation control system as claimed in claim 8, wherein a count up rate of the counter in the first power generation mode is larger than a countdown rate of the counter in the second power generation mode.

10. The electric power generation control system as claimed in claim 9, wherein the countdown rate of the counter in the second power generation mode is set according to the generated voltage of the generator.

11. The electric power generation control system as claimed in claim 8, wherein the countdown rate of the counter in the second power generation mode is set according to the generated voltage of the generator.

12. The electric power generation control system as claimed in claim 1, further comprising operation voltage-instructing means for instructing an operating voltage of a fan of an air conditioner using the battery as an electric power source, and wherein said power generation mode-determining means inhibits the first power generation mode when the instructed operating voltage is not lower than a predetermined value.

* * * * *